United States Patent [19]

Conley et al.

[11] Patent Number: 5,293,629
[45] Date of Patent: Mar. 8, 1994

[54] METHOD OF ANALYZING COMPUTER SOURCE CODE

[75] Inventors: Patrick O. Conley, Portland, Oreg.; Loren Cobb, Corrales, N. Mex.

[73] Assignee: Abraxas Software, Inc., Portland, Oreg.

[21] Appl. No.: 621,248

[22] Filed: Nov. 30, 1990

[51] Int. Cl.[5] .............................................. G06F 9/44
[52] U.S. Cl. ............................. 395/700; 364/DIG. 1;
364/280; 364/280.4; 364/261.3; 364/259
[58] Field of Search ................... 395/700, 52, 650;
364/513

[56] References Cited

U.S. PATENT DOCUMENTS

| | | | |
|---|---|---|---|
| 4,525,780 | 6/1985 | Bratt et al. | 395/425 |
| 4,763,277 | 8/1988 | Ashford | 364/513 |
| 4,924,408 | 5/1990 | Highland | 364/513 |
| 4,941,102 | 7/1990 | Darnell | 364/513 |
| 4,970,657 | 11/1990 | Wolf | 364/513 |
| 5,133,045 | 7/1992 | Gaither et al. | 395/51 |
| 5,247,693 | 9/1993 | Bristol | 395/800 |

*Primary Examiner*—Kevin A. Kriess
*Attorney, Agent, or Firm*—Stoel Rives Boley Jones & Grey

[57] ABSTRACT

A method of analyzing computer source code provides a determination of the extent to which the source code complies with guidelines relating to, for example, style, maintainability, and portability. The method includes defining a Boolean expression (12) that is assigned a TRIGGER logic state in accordance with the presence in the source code of a condition relating to a particular guideline. A guideline support computer program is also defined (14) and is executed whenever the Boolean expression is assigned the TRIGGER logic state. The guideline support program can perform a variety of operations including notification of noncompliance with the predefined guideline.

10 Claims, 1 Drawing Sheet

METHOD OF ANALYZING COMPUTER SOURCE CODE

TECHNICAL FIELD

The present invention relates to a method of analyzing computer source code and, in particular, to such a method in which compilable computer source code is analyzed to determine whether it complies with guidelines concerning, for example, style, maintainability, and portability to different compiler and processor environments.

BACKGROUND OF THE INVENTION

Most computer programs are written as source code in a high-level programming language such as the C language. Typically, the program may be written in many different ways to obtain the same overall result. The different ways of writing such a program reflect different balances between various constraints that include the speed at which the program is to operate, the programmer's or programming manager's sense of style, the importance of maintaining or updating the program over time, and the portability of the program from the processor and compiler environment in which it is written to other processor or compiler formats.

To maximize the long-term usefulness of source code, software development managers often establish guidelines for the style, maintainability, and portability of the source code to be written. Style guidelines are important in large programs, for example, to ensure consistent format in the program modules or sections written by different programmers.

Portability guidelines address the compatibility of a particular program with different types of computer, compiler, or operating system. For example, the C language has several main "standards" and is implemented in different computers and operating systems with many nonstandard features. Portability guidelines can help prevent a programmer from incorporating into the source code nonstandard or unique features of the particular C language "standard" in which a program is written. As a result, the source code would be compatible with different computers, compilers, and operating systems despite being written in one particular environment.

Maintainability guidelines address the ability to update, correct, or modify the source code sometime after it is originally written. Some programmers tend to write source code that is very abstract, complex, and compact. Such source code can be extremely difficult to maintain. Maintainability guidelines typically require that source code be written with a particular degree of simplicity and clarity to facilitate later modification. As a result, maintainability guidelines can reduce the need to discard a program and write a completely new one.

Compliance with programming guidelines is typically monitored by manual inspection of source code. For example, the source code may be read by the manager of a software development group or by other programmers within the group. Automatic (i.e., computer-executed) source code analysis is typically limited to the detection of source code errors that prevent compilation. Such automatic source code analysis is further limited in that the errors to be detected are typically fixed by the requirements of the compiler, thereby being unadaptable to guidelines concerning style, maintainability, and portability.

SUMMARY OF THE INVENTION

An object of the present invention is, therefore, to provide a method of analyzing computer source code for compliance with particular guidelines.

Another object of this invention is to provide such a method that is performed automatically by a computer.

A further object of this invention is to provide such a method that is programmable by the user.

The present invention includes a method of analyzing computer source code to determine the extent to which it complies with guidelines relating to, for example, style, maintainability, and portability to different processing and compiler environments. The method is automatically executed by a computer and allows the user to select the particular guidelines.

The method includes defining guidelines for conditions that might arise in the source code. A Boolean expression is defined in a computer programming language and is assigned a logic state in accordance with the presence or absence of the condition in the source code. For example, a style guideline could require a particular indentation (e.g., two tab spacings) for each function definition. A Boolean variable, which is a simple Boolean expression, could be assigned a particular logic state based upon the presence of a function definition in the source code. Accordingly, the Boolean variable would be assigned a TRIGGER logic state whenever a function definition is present in the source code and would be assigned a NO TRIGGER logic state otherwise.

A guideline support computer program is also defined in the programming language and is executed whenever the Boolean variable is assigned the TRIGGER logic state. The logic state of the Boolean variable functions, therefore, as a trigger condition that controls the execution of the guideline support program.

The guideline support program can perform a variety of operations. With reference to the function indentation example, the guideline support program can measure the indentation of a function definition, determine whether the indentation differs from two tab spacings, and, if appropriate, deliver a notice of noncompliance to an analysis report file that displays all such notices when the analysis of the source code is completed.

In operation, the trigger condition and the guideline support program are compiled to form a compiled analysis program. The compiled analysis program is then executed automatically by a computer to analyze the source code. During the analysis, the source code is checked at applicable points in the source code, which are called checkpoints, for compliance with the trigger conditions in the compiled analysis program. With reference to the indentation example, function definitions are typically located in a definition section of the source code. Accordingly, the definition section of the source code is the checkpoint for determining whether a function definition is present.

The execution of particular guideline support programs in response to identified trigger conditions is analogous to the organization of a forward-chaining expert system. Such forward-chaining organization is beneficial because it greatly increases the speed at which the analysis program can be executed. The method of the present invention and conventional expert systems differ, however, in how they respond to a trigger condition. A conventional expert system merely reaches a factual conclusion, whereas the present invention executes a guideline support computer program.

Additional objects and advantages of the present invention will be apparent from the following detailed description of a preferred embodiment thereof, which proceeds with reference to the accompanying drawings.

DETAILED DESCRIPTION OF PREFERRED EMBODIMENT

Figure 1:
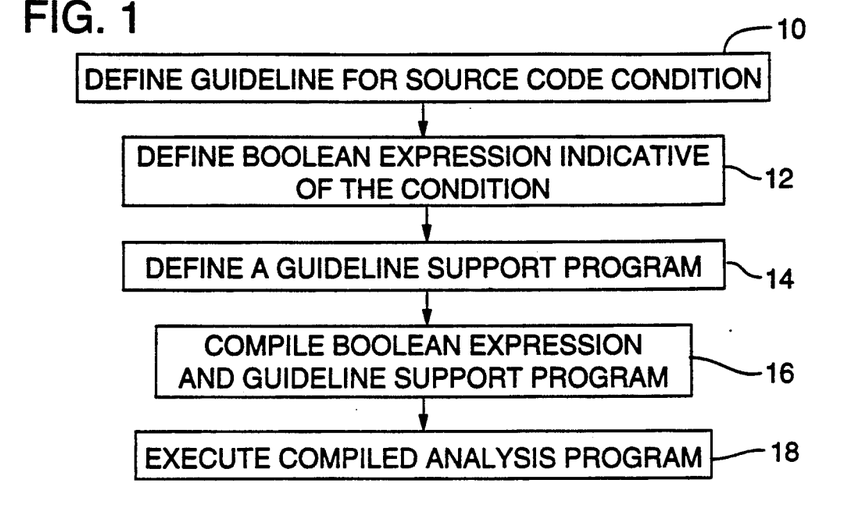
FIG. 1 is a flow diagram showing a method of preparing a source code analysis program.

FIG. 1 is a flow diagram showing a method of preparing a computer source code analysis program in accordance with the present invention. Process block 10 indicates that a user such as, for example, a manager of a software development organization, defines criteria or guidelines for the computer source code to be written by members of the organization. The user may define any number of guidelines, a large number of guidelines being directed to complete analysis of the source code and a small number of guidelines being directed to inspection of particular aspects or features of the source code. The guidelines preferably relate to particular aspects of or conditions concerning the style, portability, and maintainability of the source code. The guidelines may also be used to measure the size, logical complexity, or density of the source code.

As examples, the guidelines can be used to detect overly complex expressions; detect functions and declarations not explained by comments; monitor compliance with size standards for statements, functions, and modules; and determine whether the source code is portable to different nonstandard compilers for a particular programming language. With regard to the C language, for example, portability could be determined with regard to the "standard" compiler formats of Kernighan & Richie, Harbison & Steele, and ANSI C, as well as different compilers such as Microsoft ® C, Quick ® C, Turbo ® C, VAX ® C, AT&T ® C++, and Apple ® MPW C. In addition, guidelines can be selected to identify "silent" errors, which are typically valid programming instructions that are based upon unconfirmed, possibly false assumptions that can cause program execution errors.

The computer source code analysis program can include predefined guidelines residing in the program, as well as guidelines defined by the user. Accordingly, the guidelines defined in process block 10 can be defined by the user as described or by a programmer writing the source code analysis program and incorporating into it the predefined guidelines.

Process block 12 indicates that a Boolean expression indicative of the condition is defined in a programming language, which is preferably the C language. The Boolean expression may include a single Boolean variable or multiple numeric or Boolean variables in a logic expression. The Boolean expression is assigned a TRIGGER logic state whenever the condition is present within the source code being analyzed and is assigned a NO TRIGGER logic state otherwise.

For example, a style guideline could require that the beginning of each function definition have an indentation of two tab spacings. Accordingly, a single Boolean variable "fcn_begin" could be defined to assume the TRIGGER logic state whenever the beginning of a function definition is located in the source code. Alternatively, a Boolean expression "fcn_begin AND [lin_indent_tabs>2 OR lin_indent_tab <2]" could be defined with the "fcn-begin" variable and a "lin_indent_tab" variable that is assigned the number of tab spacings preceding the first non-white, non-comment character in the line. This Boolean expression assumes the TRIGGER logic state whenever a function definition is indented by an amount other than two tabs.

Process block 14 indicates that a guideline support program is defined in the C language. The guideline support program may perform a variety of functions whenever the Boolean expression indicates that the condition is present in the source code. For example, the guideline support program may provide notification to an analysis report file, count the number of occurrences of the condition or related conditions to perform a statistical analysis of the conditions, or access a different analysis program.

Execution of the guideline support program is initiated whenever the Boolean expression assumes the TRIGGER logic state. Accordingly, the Boolean expression functions as a trigger for the execution of the guideline support program. The Boolean expression together with its associated guideline support program is called a "rule."

With regard to the example of the function definition indentation, different guideline support programs could be used in accordance with the different Boolean expressions used to trigger the program. If the variable "fcn_begin" is used to trigger the guideline support program, the program could include the steps of measuring the indentation of the function definition, determining whether the indentation differs from two tab spacings, and, if appropriate, delivering a notice of noncompliance to an analysis report file that displays all such notices when the analysis of the source code is completed. If the expression "fcn_begin AND [lin_indent_tab>2 OR lin_indent_tab<2]]" is used to trigger the guideline support program, the program could be as simple as delivering a notice to an analysis report file or temporarily stopping the analysis of the source code and immediately displaying the notice.

Process block 16 indicates that the Boolean expression and associated guideline support program, which are expressed in the C language, are compiled by a host computer (not shown). Compilation of the rule allows it to be executed very quickly by the host computer when analyzing computer source code.

Process block 18 indicates that the compiled analysis program is executed by a host computer to analyze a source code program. The execution of the compiled analysis program is described in greater detail with reference to FIG. 2.

The variables defined in process block 12 may be indicative of a wide variety of conditions in the computer source code. The conditions and, therefore, the variables, may be classified in accordance with different hierarchical levels of a computer program. In particular, the variables may be classified as lexical variables, preprocessor variables, declaration variables, operator variables, expression variables, line variables, statement variables, function variables, module variables, or project variables.

The classification of the variables in accordance with the hierarchical levels of the source code allows the analysis program to search for source code conditions in a level-by-level manner. Each variable and related condition occur at a particular source code level of the source code hierarchy. While checking or analyzing the source code, the analysis program searches only for the conditions corresponding to the particular level being analyzed. For example, the analysis program searches for conditions represented by declaration variables only when the declaration level of the source code is being analyzed.

The hierarchical levels of the source code represent, therefore, checkpoints at which the analysis program searches for particular conditions. The use of checkpoints in the analysis of the source code increases the speed at which the analysis program can analyze source code. The increase in analysis speed is achieved because the analysis program searches only for conditions that are applicable to the checkpoint being analyzed. Searches for other conditions are delayed until their corresponding checkpoints are analyzed. This delayed searching functions as a delayed triggering of the corresponding guideline support programs.

Table 1 (set forth at the end of this specification) is a listing of preferred predefined variables incorporated into the source code analysis program of the present invention. The variables are listed according to hierarchical class, with an explanation of the source code conditions on which the variables are based. The explanations of many variables state that they are "set to 1" under certain circumstances. The logic state 1 referred to in Table 1 typically corresponds to the TRIGGER state.

It will be appreciated that many of the specific symbols or terms (i.e., conditions) to which the variables in Table 1 are directed are particular to the C language. A source code analysis program directed to another language would, therefore, employ variables directed to different conditions. The C language symbols and terms recited in Table 1 are known by persons skilled in the art and are therefore not defined herein.

Lexical variables refer to the tokens used to write or express the source code. Such tokens include, for example, names, numbers, punctuation marks, and alphabetic characters. Every lexical variable is initialized in the NO TRIGGER state when the analysis program is executed and is reinitialized to the NO TRIGGER state at the end of the scan of each token.

Preprocessor variables refer to compiler commands positioned at the beginning of the source code as instructions to the compiler. Such instructions include, for example, defining a constant that is used in the source code or directing the compiler to incorporate the contents of another source code listing into the present program. Every preprocessor variable is initialized in the NO TRIGGER state when the analysis program is executed and is reinitialized to the NO TRIGGER state at the end of the scan of each preprocessor directive.

Declaration variables refer to "declarators" that declare the name, type, and initial value of a source code variable or function. Every declaration variable is initialized in the NO TRIGGER state when the analysis program is executed and is reinitialized to the NO TRIGGER state at the end of the scan of each declarator. Whenever the declarator assigns an initial value to a source code variable, reinitialization of the declaration variable also occurs at the end of the scan of the assignment.

Operator variables refer to symbols that specify how an operand or operands of an expression are algebraically or logically manipulated. Operators may be arithmetic symbols such as + or ÷, or logical operators such as AND or OR expressions. Every operator variable is initialized in the NO TRIGGER state when the analysis program is executed and is reinitialized to the NO TRIGGER state at the end of the scan of each token. As a result, the reinitialization of operator variables is similar to that of lexical variables.

Expression variables refer to combinations of operands and operators that yield a single value or logic state. An expression could include, for example, an arithmetic equation or a logic expression. Every expression variable is initialized in the NO TRIGGER state when the analysis program is executed and is reinitialized to the NO TRIGGER state at the end of the scan of each statement.

Line variables refer to the characteristics of a line of source code. Every line variable is initialized in the NO TRIGGER state when the analysis program is executed and is reinitialized to the NO TRIGGER state at the end of the scan of each line. The end of a line is typically marked by a "newline" character.

Statement variables refer to the characteristics of source code statements, which are defined broadly to include preprocessor directives, declarations, program-control keywords, expressions, and function calls. In the C programming language, simple statements end with a semicolon and compound statements are collections of simple statements enclosed by braces (i.e.,"{ }"). Every statement variable is initialized in the NO TRIGGER state when the analysis program is executed and is reinitialized to the NO TRIGGER state at the end of the scan of each statement.

Function variables refer to the characteristics of source code functions, which have collections of declarations and statements that have a unique name and can return a value. Every function variable is initialized in the NO TRIGGER state when the analysis program is executed and is reinitialized to the NO TRIGGER state at the end of the scan of each function.

Module variables refer to the characteristics of modules, which are independently compilable source code files that cooperate with others to operate as a computer program. Modules differ from "header files" in that the former are typically substantially complete programs and the latter typically contain only commonly used declarations and definitions. Every module variable is initialized in the NO TRIGGER state when the analysis program is executed and is reinitialized to the NO TRIGGER state at the end of the scan of each module.

Project variables refer to the characteristics of entire projects, which can include multiple modules. Every project variable is initialized in the NO TRIGGER state and is reinitialized to the NO TRIGGER state at the end of the scan of an entire project.

The variables used by the source code analysis program are defined globally to simplify the organization and operation of the program. Similarly, the variables are preferably limited to simple types, such as integer variables, floating point variables, character variables, and literal strings or arrays of characters.

Some of the variables listed in Table 1 are used for measurement or counting purposes. The measurements or counts assigned to these variables may be incorporated into a Boolean expression to function as a trigger condition. In addition, the values of a variable may be stored to facilitate the calculation of statistical values (e.g., means and medians) representing the characteristics of the source code program being analyzed. Such variables are designated in Table 1 as being statistic variables.

To use the values of a statistic variable in statistical calculations, it is necessary to store each of the values assigned to the statistic variable. The statistical calculations may then be performed by a guideline support program created by a user or by invoking an analysis function that resides in the source code analysis program. It will be appreciated that the values of the non-statistic variables are typically not stored beyond the reinitialization of the variable at the completion of the analysis at a corresponding checkpoint.

Table 2A (set forth at the end of this specification) is a listing of the functions that reside within the source code analysis program. The functions are typically incorporated into the guideline support program of a user-defined rule. Table 2A provides for each of the listed functions a statement of the arguments on which the function acts and a brief description of the function. Table 2B explains the notation of the arguments listed in Table 2A.

The source code analysis program also recognizes a predefined constant that may be incorporated into the source code being analyzed. The constant functions to identify for the source code analysis program sections of the source code that are not to be analyzed. For example, the predefined constant could precede assembly language code that is intermixed with C language program code that is being analyzed.

Execution of the source code analysis program is initiated by a command line of the form:

check -options mysource.c in which "check" invokes the source code analysis program, "mysource.c" refers to the name of a C language source code file to be analyzed, and "-options" identifies the rules to be used by the analysis program. If no options are specified, the source code analysis program defaults to the set of rules most recently used. Table 3 (set forth at the end of this specification) lists predefined options that reside in the analysis program.

Figure 2:
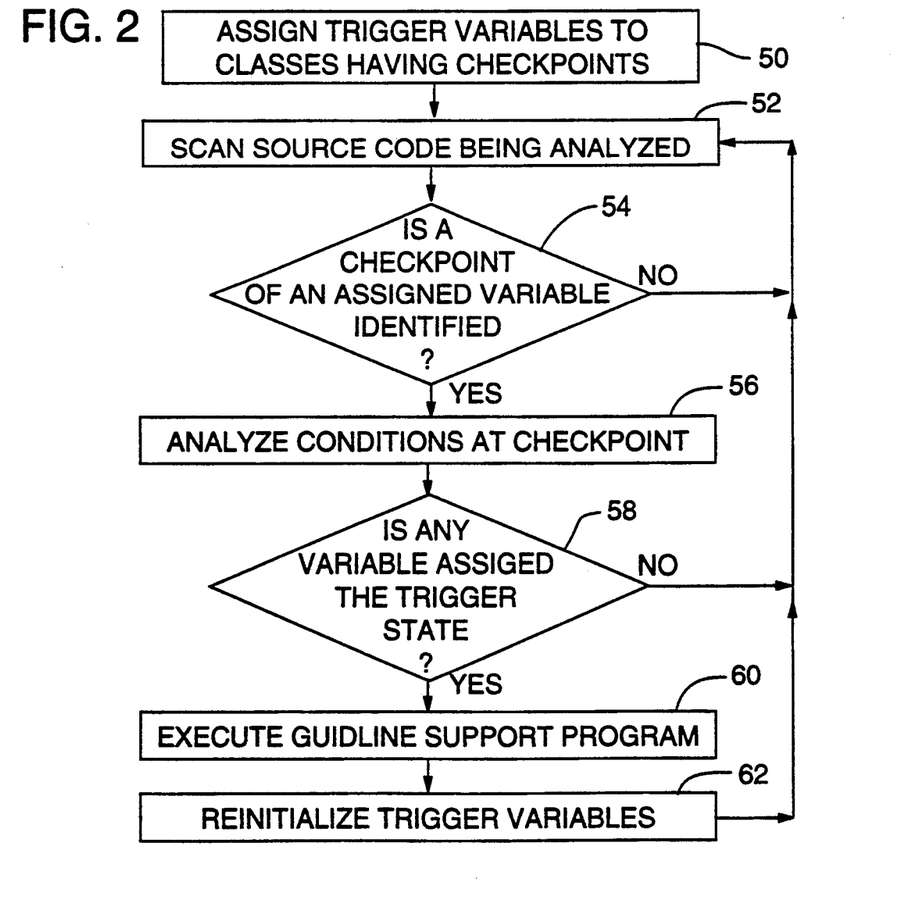
FIG. 2 is a flow diagram showing a method of analyzing compilable source code.

FIG. 2 is a flow diagram showing the execution of the source code analysis program referred to in process block 18 of FIG. 1. In particular, process block 50 indicates that the trigger variables defined in process block 12 of FIG. 1 are associated with their particular classes and checkpoints. It will be appreciated, therefore, that the trigger variables and their associated guideline support programs need not be defined in any particular order or sequence as would be the case in a conventional computer program. Such flexibility in the definition of the analysis rules greatly simplifies the use of the source code analysis program.

Process block 52 indicates that the host computer scans the source code being analyzed.

Decision block 54 represents an inquiry as to whether the scan of the source code identifies a checkpoint corresponding to one of the classes of trigger variables identified at process block 50. Whenever the source code does not correspond to such a checkpoint, decision block 54 returns to process block 52. Whenever the source code does correspond to such a checkpoint, decision block proceeds to process block 56.

Process block 56 indicates that the conditions corresponding to the variables associated with the identified checkpoint are analyzed by the host computer. The analysis is executed for each of the variables applicable to the checkpoint.

Decision block 58 represents an inquiry as to whether any of the variables analyzed at the checkpoint is assigned the TRIGGER state. Whenever none of the variables is assigned the TRIGGER state (i.e., all variables remain in the NO TRIGGER state), decision block 58 returns to process block 52. Whenever any of the variables is assigned the TRIGGER state, decision block 58 proceeds to process block 60.

Process block 60 indicates that the guideline support programs associated with the trigger variables assigned the TRIGGER state are executed.

Process block 62 indicates that the variables assigned the TRIGGER state are reinitialized. Process block 62 returns to process block 52.

It will be obvious to those having skill in the art that many changes may be made to the details of the above-described preferred embodiment of the present invention without departing from the underlying principles thereof. The scope of the present invention should be determined, therefore, only by the following claims.

TABLE 1

| LEXICAL VARIABLES | |
|---|---|
| lex_ansi_escape | Set to 1 if an escape sequence contains one of the new ANSI escape characters: a, v, x, or ? |
| lex_backslash | Set to 1 if a backslash-newline pair is found at the end of a line that is not preprocessor directive. |
| lex_bad_call | Set to 1 if a macro call has the wrong number of arguments |
| lex_bad_eof | Set to 1 if an end-of-file is encountered on a nonempty line, or within a comment, string literal, or character constant. |
| lex_big_octal | Set to 1 if a numeric escape sequence or octal integer contains the digits 8 or 9. |
| lex_char_empty | Set to 1 if an empty character constant is found (e.g.''). This variable does not flag the null character constant ('\0'). |
| lex_char_long | Set to 1 if a character constant is longer than one character. |
| lex_float | Set to 1 if a numeric constant is found with the suffix 'F' or 'f'. |
| lex_hex_escape | Set to 1 whenever a hexadecimal numeric escape sequence is found. |
| lex_identifier | Set to 1 whenever an identifier is found (see Table 2A for a related function "int identifier"). |
| lex_keyword | Set to 1 whenever a C keyword is found (see Table 2A for a related function "int keyword"). |
| lex_lc_long | Set to 1 if a numeric constant ends with a lowercase 'L', indicating a long type constant. |
| lex_long_float | Set to 1 if a floating constant is found with the suffix 'L' or 'l'. |
| lex_macro_token | Set to 1 if a lexical token originates from a macro expansion. |
| lex_nl_eof | Set to 1 if a nonempty source file does not end with a newline. |
| lex_nonstandard | Whenever a character is found that is not in the standard C set (i.e., nonstandard), the value of this variable is set to the integer representation of the nonstandard character. |
| lex_not_KR_escape | Whenever an escape character is found that is not defined by Kernighan & Ritchie (i.e., \n, \b, \t, \r, \f, \\, \", \'), this variable is set to the integer representation of the character. |
| lex_not_manifest | Set to 1 if a numeric constant other than 0 or 1 is used in any context other than a |

TABLE 1-continued

| | |
|---|---|
| lex_num_escape | macro definition or a comment. Whenever a nonzero numeric escape sequence is found, the value of this variable is set to the value of the numeric escape sequence. |
| lex_octal | Set to 1 if an integer constant begins with the digit 0 (indicating octal). |
| lex_punct_after | Set to 1 if a comma or semicolon is not followed by a whitespace character. |
| lex_punct_before | Set to 1 if a comma or semicolon is preceded by a whitespace. |
| lex_str_concat | Set to 1 if two string constants are found and as separated only by whitespace. |
| lex_str_macro | Set to 1 when a macro identifier is found within a string constant. |
| lex_str_trigraph | Set to 1 if a trigraph is found in a string literal. |
| lex_sub_before | Set to 1 if a left bracket is preceded by a whitespace. |
| lex_sub_open | Set to 1 if a left bracket is followed by whitespace. |
| lex_sub_close | Set to 1 if a right bracket is preceded by whitespace. |
| lex_suffix | Set to 1 if a numeric constant is found with any suffix 'U' or 'u'. |
| lex_trigraph | Set to 1 if an ANSI trigraph is found (anywhere). |
| lex_unsigned | Set to 1 if a numeric constant is found with the suffix 'U' or 'u'. |
| lex_wide | Set to 1 if an ANSI wide string or character constant is found (prefix L). |
| PREPROCESSOR VARIABLES | |
| pp_ansi | Set to 1 if a preprocessor feature is encountered that is new with the ANSI standard. |
| pp_arg_count | Set to the number of arguments found in a macro definition. (Use pp_arglist_empty to detect zero argument macro functions.) |
| pp_arg_multiple | Set to 1 if a formal argument of a macro is used more than once in the macro definition. |
| pp_arg_paren | Set to 1 if a macro argument is used without being surrounded by parentheses. |
| pp_arith | Set to 1 if a preprocessor directive requires arithmetic calculation. |
| pp_bad_white | Set to 1 if a non-space, non-tab whitespace character (e.g. vertical tab, form-fee, or backspace) is encountered within a preprocessor directive. |
| pp_benign | Set to 1 if a macro is redefined to be virtually identical to its previous definition. |
| pp_comment | Set to 1 if two tokens within a macro definition are separated only be a comment. |
| pp_const | Set to 1 if the definition of a macro has no arguments (i.e. the macro is a constant). |
| pp_defined | Set to 1 if the preprocessor function "defined" is encountered. |
| pp_depend | Set to 1 if "#undef" is used in a macro that is used by other macros. |
| pp_elif | Set to 1 if the preprocessor directive "#elif" is encountered. |
| pp_empty_arglist | Set to 1 if the definition of a macro function has no arguments. |
| pp_empty_body | Set to 1 if the definition of a macro has no body. |
| pp_error | Set to 1 if the preprocessor directive "#error" is encountered. |
| pp_include_depth | Set the new depth of inclusion whenever a directive "#include" is executed, or the end of a header is encountered. |
| pp_keyword | Set to 1 if a macro name is a C or C++ keyword. |
| pp_lowercase | Set to 1 if a macro name is defined with letters that are lowercase |
| pp_macro_conflict | Set to 1 if a macro is defined differently in separate modules of a project |
| pp_macro_count | Set to the number of macros currently defined whenever a macro is defined or undefined. Multiply-defined macros are only counted once. |
| p_macro_dup | Set to 1 if a macro is defined in more than one file. |
| pp_paste | Set to 1 if the ANSI "paste" operator (##) is found in a macro definition. |
| pp_pragma | Set to 1 if a preprocessor directive "#pragma" is encountered. |
| pp_semicolon | Set to 1 if a macro definition ends with a semicolon. |
| pp_sizeof | Set to 1 if a preprocessor directive requires the use of the operator "#sizeof". |
| pp_stack | Set to 1 if a macro is redefined within a module. Maintain at 0 if the redefinition is benign. |
| pp_stringize | Set to 1 if the ANSI "stringize" operator (#) is found in a macro definition. |
| pp_sub_keyword | Set to 1 if the keyword in a preprocessor directive is itself a macro name. |
| pp_trailer | Set to 1 if a preprocessor line contains any non-white characters after the end of the directive and before the end of the line. |
| pp_undef | Set to 1 whenever "#undef" is used. |
| pp_unknown | Set to 1 if a preprocessor directive is found with which the source code analysis program is unfamiliar. |
| pp_unstack | Set to 1 if "#undef" is used to unstack multiply-defined macros. |
| pp_white_before | Set to the amount of whitespace (in characters) that precedes the # character in a preprocessor directive. |
| pp_white_between | Set to the width of whitespace that is found between the # character and the keyword in a preprocessor directive. |
| DECLARATION VARIABLES | |
| dcl_aggr | Set to 1 whenever a "struct", "union", or array is declared. |
| dcl_all_upper | Set to 1 if only uppercase letters are found in the declaration of an identifier name. |
| dcl_ambig | If two identifiers in the same name space agree on the first 6 or more characters, then this variable is set to the number of characters to which they agree (see also dcl_extern_ambig). |
| dcl_any_upper | Set to 1 if an uppercase letter is found anywhere in the declaration of an identifier name. |
| dcl_array | Set to 1 whenever an array declarator is found. |
| dcl_array_size | Set to the number of elements in an array whenever an array declarator is found. |
| dcl_auto_init | Set to 1 if an initializer for an automatic array, "struct", or "union" is found. |
| dcl_bitfield | Set to 1 if a bit field is found. |
| dcl_bitfield_size | Set to the number of bits in a bit field. |
| dcl_bitfield_union | Set to 1 if a bit field is declared as a member of a union |
| dcl_const | Set to 1 when the type qualifier "const" is used in a declaration. |
| dcl_empty | Set to 1 if an empty declaration is found. |
| dcl_enum | Set to 1 when an "enum" is declared. |
| dcl_extern | Set to 1 if the "extern" storage class is explicitly specified in a declaration. |
| dcl_extern_init | Set to 1 if an initializer for an "extern" variable is found. |
| dcl_first_upper | Set to 1 if an initial upper-case letter is found in the declaration of an identifier name. |
| dcl_function_name | Set to 1 if a function name has been declared. |
| dcl_global_name | Set to 1 if a global variable name has been declared. |
| dcl_hidden | Set to 1 if an inner-block declaration hides an outer block declaration. |
| dcl_Hungarian | Set to 1 if the Hungarian style is detected (a capital letter is immediately preceded by a lowercase letter). |
| dcl_ident_length | Set to the number of characters in the declared identifier. (This is a statistic |

TABLE 1-continued

| | |
|---|---|
| | variable.) |
| dcl_init_arith | Set to 1 when a computed initializer is found, or when a computed explicit value for an enumerated constant is found. |
| dcl_local_name | Set to 1 if a local variable name has been declared. |
| dcl_member | Set to the number of members when a "struct" or "union" is declared. (This is a statistic variable.) |
| dcl_no_specifier | Set to 1 if a declaration has neither a type nor a storage class specifier. |
| dcl_signed | Set to 1 when the type specifier "signed" is used in a declaration. |
| dcl_static | Set to 1 when the "static" storage class is specified in a declaration. |
| dcl_struct | Set to 1 when a "struct" is declared. |
| dcl_typedef_name | Set to 1 if a "typedef" name has been declared. |
| dcl_union | Set to 1 when a "union" is declared. |
| dcl_union_init | Set to 1 when a "union" initializer is found. |
| dcl_unsigned | Set to 1 when the type specifier "unsigned" is used in a declaration. |
| dcl_underscore | Set to 1 if the name of a declared identifier begins with an underscore character. |
| dcl_volatile | Set to 1 when the type qualifier "volatile" is used in a declaration. |
| dcl_zero_array | Set to 1 whenever an array declarator is found to specify a dimension of zero. |
| OPERATOR VARIABLES | |
| op_add | Set to 1 if an add (+) operator is found. |
| op_add_assign | Set to 1 if an "+=" operator is found. |
| op_address | Set to 1 if an address (&) operator is found. |
| op_and_assign | Set to 1 if a "&=" operator is found. |
| op_arglist | Set to 1 if a function call operator is found (parentheses). |
| op_assign | Set to 1 if an assignment (=) operator is found. |
| op_bit_and | Set to 1 if a bitwise AND (&) operator is found. |
| op_bit_not | Set to 1 if a bitwise NOT operator is found. |
| op_bit_or | Set to 1 if bitwise OR (|) operator is found. |
| op_bit_xor | Set to 1 if a bitwise XOR (^) operator is found. |
| op_cast | Set to 1 if a cast is found. |
| op_close_brace | Set to 1 if a close brace is found. |
| op_close_bracket | Set to 1 if a close bracket is found. |
| op_close_paren | Set to 1 if a close parenthesis for a sub-expression has been found. |
| op_comma | Set to 1 if a comma operator is found. |
| op_cond | Set to 1 if a conditional (?:) operator is found. |
| op_decrement | Set to 1 if a pre or post-fix decrement (--) operator is found. |
| op_div | Set to 1 if a division (/) operator is found. |
| op_div_assign | Set to 1 if a /= operator is found. |
| op_equal | Set to 1 if a == operator is found. |
| op_increment | Set to 1 if a pre or post-fix increment (++) operator is found. |
| op_indirect | Set to 1 if an indirection (*) operator is found. |
| op_init | Set to 1 if the initialization operator (equal sign within a declarator is found). |
| op_left_assign | Set to 1 if a "<<=" operator is found. |
| op_left_shift | Set to 1 if a left shift (<<) operator is found. |
| op_less | Set to 1 if a less than (<) operator is found. |
| op_less_eq | Set to 1 if a "<=" operator is found. |
| op_log_and | Set to 1 if a logical conjunction (&&) operator is found. |
| op_log_not | Set to 1 if a logical negation (!) operator is found. |
| op_log_or | Set to 1 if a logical disjunction (||) operator is found. |
| op_member | Set to 1 if a direct member selector is found (a period). |
| op_more | Set to 1 if a more than (>) operator is found. |
| op_more_eq | Set to 1 if a "=>" operator is found. |
| op_mul | Set to 1 if a multiplication (*) operator is found. |
| op_mul_assign | Set to 1 if a "*=" operator is found. |
| op_negate | Set to 1 fi a arithmetic negation (−) operator is found. |
| op_not_eq | Set to 1 if a "!=" operator is found. |
| op_open_brace | Set to 1 if an open brace is found. |
| op_open_paren | Set to 1 if an open parenthesis for a subexpression has been found. |
| op_or_assign | Set to 1 if a "|=" operator is found. |
| op_plus | Set to 1 if the unary plus (+) operator is found, note that this is not the binary add operator. |
| op_point | Set to 1 if an indirect member selector is found (−>). |
| op_rem | Set to 1 if a remainder (%) operator is found. |
| op_rem_assign | Set to 1 if a "%=" operator is found. |
| op_right_assign | Set to 1 if a ">>=" operator is found. |
| op_semicolon | Set to 1 if a semicolon is found. |
| op_separator | Set to 1 if a command separator (not operator) or colon is found. |
| op_sizeof | Set to 1 if a size of operator is found with an argument that is not surrounded by parentheses. |
| op_sub_assign | Set to 1 if a "−=" operator is found. |
| op_subscript | Set to 1 if a subscript operator is found (brackets). |
| op_subt | Set to 1 if a subtract (−) operator is found. |
| op_xor_assign | Set to 1 if a "^=" operator is found. |
| EXPRESSION VARIABLES | |
| exp_arg_before | Set to 1 if the open parenthesis is a function argument is preceded by whitespace. |
| exp_arg_close | Set to 1 if the close parenthesis of a function argument is preceded by whitespace. |
| exp_arg_open | Set to 1 if the open parenthesis of a function argument is followed by whitespace. |
| exp_high_space | Set to 1 if a high-precedence operator is preceded or followed by any whitespace. |
| exp_low_space | Set to 1 if a low-precedence operator is not surrounded by whitespace. |
| exp_no_prototype | Set to 1 if a function call is found without a prototype for the function. |
| exp_not_declared | Set to 1 if a function call is found without a declaration for the function. |
| exp_operands | Set to the number of standard operands found in an expression, before macro expansion. (This is a statistic variable.) |
| exp_operators | Set to number of standard operators found in an expression, before macro expansion. (This is a statistic variable.) |
| exp_tokens | Set to the number of tokens found in an expression before macro expansion. (This is a statistic variable.) |
| LINE VARIABLES | |
| lin_end | Set to 1 when an end-of-line marker has been found (either a newline character or a backslash-newline pair). |
| lin_H_operators | Set to the number of Halstead operators found in a line of code before macro expansion. (This is a statistic variable.) |
| lin_has_code | Set to 1 if a line has a comment. |
| lin_indent_space | Set to the number of leading space characters found before the first non-white non-comment character of a line (not set on preprocessor lines). |
| lin_is_comment | Set to 1 if a line has no C code and either contains a comment or is contained within a comment. |
| lin_is_white | Set to 1 if a line consists entirely of whitespace (spaces, tabs, or empty). |
| line_is_exec | Set to 1 if a line contains code that is executable. |

TABLE 1-continued

| | |
|---|---|
| lin_length | Set to the number of characters in the line. |
| lin_nest_level | Set to the nesting level when the first nonwhite character of a line is found. The counting of braces depends on the command line option -B (see Table 3). |
| lin_nested_comment | Set to 1 if a comment is found nested within another comment. |
| lin_new_comment | Set to 1 if a "//" comment is found. |
| lin_operands | Set to the number of standard operands found in a line of code, before macro expansion. (This is a statistic variable.) |
| lin_operators | Set to the number of standard C operators found in a line of code before macro expansion. (This is a statistic variable.) |
| lin_tokens | Set to the number of tokens found in a line of code before expansion. (This is a statistic variable.) |
| STATEMENT VARIABLES | |
| stm_aggr | Set to the number of "struct", "union", or array variables declared in a compound statement. (This is a statistic variable.) |
| stm_cp_begin | Set to 1 when the beginning of a compound statement has been found. |
| stm_end | Set to 1 when the end of a statement has been found. |
| stm_is_comp | Set to 1 if the statement is a compound-statement. |
| stm_is_expr | Set to 1 if the statement is an expression-statement. |
| stm_is_high | Set to 1 if the statement is a compound-, selection-, iteration-, or labelled-statement. |
| stm_is_iter | Set to 1 if the statement is an iteration-statement. |
| stm_is_jump | Set to 1 if the statement is a jump-statement. |
| stm_is_label | Set to 1 if the statement is a labeled-statement. |
| stm_is_low | Set to 1 if the statement is an expression- or jump-statement. |
| stm_is_nonexec | Set to 1 if the statement is a type definition, declaration, or preprocessor directive. |
| stm_is_select | Set to 1 if the statement is a selection-statement. |
| stm_locals | Set to the number of local variables declared in a compound statement. (This is a statistic variable.) |
| stm_members | Set to the number of local "struct" or "union" members declared in a compound statement. (This is a statistic variable.) |
| stm_operands | Set to the number of standard operands found in a statement, before macro expansion. (This is a statistic variable.) |
| stm_operators | Set to the number of operators found in a statement. (This is a statistic variable.) |
| stm_relation | Set to the number of Boolean relational operators found in a statement. (This is a statistic variable.) |
| stm_tokens | Set to the number of tokens found in a statement. (This is a statistic variable.) |
| FUNCTION VARIABLES | |
| fcn_begin | Set to 1 when the beginning of a function has been found. |
| scn_com_lines | Set to the number of pure comment lines in the definition of a C function. (This is a statistic variable.) |
| fcn_decisions | Set to the number of binary decision points in a function. (This is a statistic variable.) |
| fcn_end | Set to 1 when the end of a function has been found. |
| fcn_exec_lines | Set to the number of executable lines in the definition of a C function. (This is a statistic variable.) |
| fcn_H_operators | Set to the number of Halstead operators found in a function before macro expansion. (This is a statistic variable.) |
| fcn_high | Set to the number of high-level statements found in the definition of a C function. (This is a statistic variable.) |
| fcn_low | Set to the number of low-level statements found in the definition of a C function. (This is a statistic variable.) |
| fcn_nonexec | Set to the number of non-executable statements found in the definition of C function (--"This is a statistic variable."--). |
| fcn_operands | Set to the number of standard operands found in a function, before macro expansion (--"This is a statistic variable."--). |
| fcn_operators | Set to the number of standard C operators found in a function before macro expansion (--"This is a statistic variable."--). |
| fcn_parm_hidden | Set to 1 if a function parameter has the same name as an identifier declared within the function's compound statement. |
| fcn_tokes | Set to the number of tokens found in a function before macro expansion. (This is a statistic variable.) |
| fcn_total_lines | Set to the total number of lines in the definition of a C function. (This is a statistic variable.) |
| fcn_white_lines | Set to the number of whitespace lines in the definition of a C function. (This is a statistic variable.) |
| MODULE VARIABLES | |
| mod_begin | Set to 1 when the beginning of a source module has been encountered. |
| mod_com_lines | Set to the number of pure comment lines in a module. |
| mod_decisions | Set to the number of binary decision points in a module. (This is a statistic variable.) |
| mod_end | Set to 1 when the end of a source module (a file and all of its included files) has been reached. |
| mod_exec_lines | Set to the number of executable lines in a module. |
| mod_functions | Set to the number of functions defined in module. |
| mod_H operators | Set to the number of Halstead operators found in a module before macro expansion. |
| mod_high | Set to the number of high-level statements found in a module. |
| mod_low | Set to the number of low-level statements found in a module. |
| mod_macros | Set to the number of macros defined in a module. |
| mod_member | Set to the number of local "struct" or "union" members declared in a module. (This is a statistic variable.) |
| mod_nonexec | Set to the number of non-executable statements found in a module. |
| mod_operands | Set to the number of standard operands found in a module, before macro expansion. (This is a statistic variable.) |
| mod_operators | Set to the number of standard C operators found in a module before macro expansion. |
| mod_total_lines | Set to the total number of lines in a module. |
| mod_tokens | Set to the number of tokens found in a module before macro expansion. |
| mod_white_lines | Set to the number of whitespace lines in a module. |
| PROJECT VARIABLES | |
| prj_begin | Set to 1 at the start of a project. |
| prj_com_lines | Set to the number of pure comment lines in a module. |
| prj_conflicts | Set to the number of conflicting macro definitions found in a project. |
| prj_decisions | Set to the number of binary decision points in a project. |
| prj_exec_lines | Set to the number of executable lines in a module. |
| prj_functions | Set to the number of functions defined in a project. |

TABLE 1-continued

| | |
|---|---|
| prj_H_operators | Set to the number of Halstead operators found in a project before macro expansion. |
| prj_high | Set to the number of high-level statements found in a project. |
| prj_low | Set to the number of low-level statements found in a project. |
| prj_macros | Set to the number of macros defined in a project. |
| prj_nonexec | Set to the number of non-executable statements found in a project. |
| prj_operands | Set to the number of standard operands found in a project, before macro expansion. |
| prj_operators | Set to the number of standard C operators found in a project before macro expansion. |
| prj_tokens | Set to the number of tokens found in a project before macro expansion. |
| prj_total_lines | Set to the number of lines in a module. |
| prj_warnings | Set to the number of source code analysis program warnings issued for this project. |
| prj_white_lines | Set to the number of whitespace lines in a module. |

TABLE 2A float corr( statistic x, statistic y)

This function returns the correlation of its two argument variables. The argument variables must have the same number of cases. Pearson's product-moment correlation is returned.

void define( char name[ ], int n )

This function defines a macro with the specified name, and Dgives it the specified numeric value n.

void exit( int n )

This function causes an immediate exit from the source code analysis program returning the error number n to the operating system.

void fatal( int n, char message[ ] )

This function prints an error number and message to "stderr[ and then exits the source code analysis program, returning the error number n to the operating system.

char * file_name( void )

This function returns the name of the file that is currently being checked. See also the functions: mod_name( ), prj_name( ).

char * fcn_name( void )

This function returns the name of the function that is currently being checked.

int identifier( char name[ ] )

This function is designed to be used as a trigger in an analysis program rule. It returns the value 1 whenever a new identifier has been encountered that matches its argument string. See also: keyword( ).

int keyword( char name[ ] )

This function is designed to be used as a trigger in an analysis program rule. It returns the value 1 whenever a Kernhigan & Ritchie C, ANSI C. or C++ keyword has been encountered that matches its argument string. See also the function: identifier( ).

char * lib_name( void )

This function is designed to be used as a trigger in an analysis program rule. It returns the filename whenever a library header file is opened with the "#include <filename>" directive.

float maximum) statistic x)

This function returns the maximum value of its statistic argument variable.

float mean( statistic x )

This function returns the mean (i.e., arithmetic average) of its statistic argument variable.

float minimum( statistic x )

This function returns the minimum value of its statistic argument variable.

char * mod_name( void )

This function returns the name of the module that is currently being checked. A "module" is a C source file and all of its header files. Its name is the name of the first source file in the module. See also the functions: file_name( ), prj_name( ).

int ncases( statistic x )

This function returns the number of cases recorded for its statistic argument variable.

int option( char c )

This function returns 1 if the command line option specified by the variable c is in effect (i.e., has been specified by the user), otherwise it returns 0.

void printf( char format[ ], ... )

The printf function is modelled after the C "stdio" function "printf". The argument variables may be of type int, float, char, char[ ], or char *.

char * prj_name( void )

This function returns the name of the project that is currently being checked (i.e.. the name of the .prj file that identifies the component modules of a project to the analysis program.) See also the functions: mod_name( ). file_name( ).

void reset( statistic x )

This function resets its statistic argument variable. All recorded cases are erased, and the case count is reset to zero.

void set_option( char c, int n )

This function assigns the value n to the command line option specified by the variable c. For example, when set_option("B",1) is executed by the analysis program, all succeeding rules are evaluated as if the user had specified the -B option (Table 3) on the command line.

float stdav( statistic x )

This function returns the standard deviation of its statistic argument variable.

void undefine( char name[ ] )

This function undefines the macro with the specified name.

float variance( statistic x )

This function returns the variance of its statistic argument variable.

void warn( int n, char message[ ] )

This function prints an error number and message to the "stderr" stream, together with the filename and line number of the C source which triggered the message. If a listing file is open, then the warning message is echoed in the listing file with a marker indicating the position of the error.

TABLE 2B

| | |
|---|---|
| statistic x | The argument is a statistic-type variable. |
| char name[] | The argument is a literal string of characters representing a name. |
| char message[] | The argument is a literal string of characters representing a message. |
| char format[] | The argument is a literal string of characters representing a variable type or format. |
| int n | The argument is an integer number. |
| void | No argument is required for this function. |

TABLE 3

| | |
|---|---|
| -A | Use the analysis program rule file that checks for ANSI C compatibility. (This option is a special single-letter case of the -R option, which is described below.) |
| -B | Instruct the analysis program that braces are on the same nesting level as material surrounded by the braces. If this option is not specified, then the analysis program assumes that the braces are at the previous nesting level. This option only affects the predefined variable lin_nest_level. |
| -E | Do not ignore tokens that are derived from macro expansion when performing counts, e.g. of operators and operands. The default (-E not specified) is for the analysis program to ignore all macro-derived tokens when counting. |
| -I | List all header files in the listing file. The -L option is assumed if this option is found. If -L is found without -I, then the listing file created by the analysis program will not display the contents of header files. |
| -H | Specify a path to search when looking for header files. Use a separate -H for each path. The pathname must follow -H, e.g., check -HC: project headers src.c The pathname does not have to end with a backslash. |
| -L | Make a listing file for the source file or project, with the analysis program messages interspersed at appropriate points in the listing. The default name for the listing file is check.lst. |
| -M | List all macro expansions in the file. Each line containing a macro is first listed as it is found in the source file, and then listed a second time with all macros expanded. The -L option is assumed if -M is found. If -L is found without -M, then the listing file created by the analysis program will not exhibit macro expansions. |
| -O | Send all the analysis program "stderr" output to "stdout". This is useful for those operating systems (e.g. MSDOS) that do not permit any redirection or piping of stderr output. |
| -P | Show progress of the source code analysis. When this option is exercised, the analysis program will print information concerning each function in the source file. |
| -R | Specify a rule file. The name of the rule file must follow immediately, e.g. check -Rmyrules.cc mysource.c The extension '.cc' on the rule file may be omitted, since it is clear from the context that this is a rule file. The analysis program will compile the rules into an object file named myrules.cco. |
| -S | Suppress analysis within header files. When this option is exercised, the analysis program will not apply its rules to source text that is obtained from header files. |
| -T | Create a file of prototypes for all functions defined in the project. This file will be given the default name myprotos.h. |

What is claimed is:

1. A method of analyzing computer source code having characteristics of maintainability, portability, and style and being organized as plural hierarchical program levels, to detect noncompliance with a predefined criterion relating to at least one of the characteristics, comprising:

defining a source code trigger condition relating to the predefined criterion;

assigning the source code trigger condition to a condition class corresponding to one of the hierarchical program levels;

defining in a selected programming language a criterion support program that supports the predefined criterion;

directing a computer to review the computer source code to determine whether the source code trigger condition is present therein; and whenever the source code trigger condition is present in the computer source code, executing the criterion support program to support maintenance of the predetermined criterion in the computer source code.

2. The method of claim 1 in which the source code trigger condition is expressed in the selected programming language.

3. The method of claim 2 in which the selected programming language is a C language.

4. The method of claim 1 in which the source code trigger condition is expressed as a Boolean condition in the selected programming language.

5. The method of claim 4 in which the source code trigger condition and the criterion support program are compiled.

6. The method of claim 1 in which the review of the computer source code is directed to the hierarchical program level corresponding to the condition class to which the source code trigger condition is assigned.

7. The method of claim 4 in which the review of the computer source code is directed to the hierarchical program level corresponding to the condition class to which the source code trigger condition is assigned.

8. The method of claim 7 in which the Boolean condition is initialized in a first logic state when review of the computer source code begins and is reinitialized to the first logic state after each review of the computer source code directed to the hierarchical program level.

9. The method of claim 4 in which the Boolean condition and the criterion support program are compiled to increase the speed at which the computer source code is analyzed.

10. The method of claim 1 in which execution of the criterion support program includes delivering notification to a notification file residing within the computer whenever the source code trigger condition is present.

* * * * *